United States Patent
Yamamoto et al.

(10) Patent No.: US 6,814,902 B2
(45) Date of Patent: Nov. 9, 2004

(54) METHOD FOR CONTINUOUSLY MANUFACTURING OPTICAL ARTICLE

(75) Inventors: Tamenobu Yamamoto, Higashiosaka (JP); Fumio Ishibashi, Higashiosaka (JP); Koichiro Oka, Higashiosaka (JP)

(73) Assignee: Yamamoto Kogaku Co. LTD, Osaka (JP)

( * ) Notice: Subject to any disclaimer, the term of this patent is extended or adjusted under 35 U.S.C. 154(b) by 485 days.

(21) Appl. No.: 09/960,473

(22) Filed: Sep. 24, 2001

(65) Prior Publication Data

US 2002/0036359 A1 Mar. 28, 2002

(30) Foreign Application Priority Data

Sep. 28, 2000 (JP) ........................................ 2000-296480

(51) Int. Cl.⁷ ............................................... B29D 11/00
(52) U.S. Cl. ........................ 264/1.7; 264/163; 264/328.1
(58) Field of Search .......................... 264/1.7, 2.7, 163, 264/1.31, 1.32, 1.34, 259, 271.1, 328.1

(56) References Cited

U.S. PATENT DOCUMENTS

| 5,805,336 A | 9/1998 | Dalzell et al. |
| 5,833,889 A | * 11/1998 | Tanikita et al. ............... 264/1.9 |
| 5,856,860 A | 1/1999 | Bhalakia et al. |
| 5,993,723 A | * 11/1999 | Tanaka et al. ............... 264/500 |

FOREIGN PATENT DOCUMENTS

| EP | 0 642 910 A1 | 12/1993 |
| EP | 0 727 677 B1 | 8/1996 |
| EP | 0 727 677 A1 | 8/1996 |
| JP | 2130113 | 5/1990 |
| JP | 2139213 | 5/1990 |

* cited by examiner

*Primary Examiner*—Michael P. Colaianni
*Assistant Examiner*—Yewebdar Tadesse
(74) *Attorney, Agent, or Firm*—Kenyon & Kenyon

(57) ABSTRACT

There is provided a method for continuously manufacturing an optical article which comprises a first step of thermal press-molding a sheet-like curved body and a second step of insert injection-molding a back resin on a concave side of the sheet-like curved body, while transferring the continuous sheet in a longitudinal direction, using an apparatus for manufacturing an optical article in which a press-molding machine which can thermal press-mold the sheet-like curved body and an insert injection-molding machine equipped with a mold having a curvature similar to that of the sheet-like curved body are serially positioned in this order, wherein a cycle of thermal press-molding and a cycle of insert injection-molding are synchronized to continuously insert-mold the back resin on a concave side of the sheet-like curved body while continuously thermal press-molding the sheet-like curved body.

20 Claims, No Drawings

METHOD FOR CONTINUOUSLY MANUFACTURING OPTICAL ARTICLE

FIELD OF THE INVENTION

The present invention relates to a method for continuously manufacturing an optical article having the large impact strength in which a polarizer is incorporated, particularly, a method for continuously manufacturing an optical lens, for example, a lens used for goggles, or sunglasses with or without degree having the large impact strength.

BACKGROUND OF THE INVENTION

Goggles and glasses which are used in sports fields such as skiing, snowboarding, ice skating, sailing, boating, biking and motorcycling, and in industrial fields such as an architectural and civil engineering industry, a chemical industry and a machine manufacturing industry are used for the purpose of prevention of dazzling due to the direct or reflected light and protection of eyes from a wind, a snowflake, a rain, seawater, water, sands, a chemical agent or a foreign body. In addition, as a general use, sunglasses with or without degree are used for the purpose of prevention of dazzling due to the ray or the reflected light.

Hitherto, there have been manufacturing techniques of a polarizing glass lens in which both sides of a polarizer sheet are covered with a glass, and of a polarizing plastic lens, for example, polarizing CR-39 lens, manufactured by inserting a polarizer sheet into a mold followed by cast-molding.

In addition, there has been known a method for manufacturing an optical molded composite by an insert injection-molding method in which a polarizing plate having a laminate structure holding a polarizer sheet between two polycarbonate sheets is inserted into a mold, and then a polycarbonate resin layer is thermally adhered to the polycarbonate sheet portion on either side of the polarizing plate (Japanese Unexamined Patent Publication No. 245259/1999).

However, the polarizing glass lens in which both sides of the polarizer sheet are covered with a glass as described above has defects of easily fractorable property due to a glass base, and of poor processability due to small deformability of a base.

In addition, in the polarizing plastic lens manufactured by an insert cast-molding method in which a polarizer sheet is inserted into a mold and cast-molded has problems that a technique for incorporating a polarizer sheet into a mold is required, and that polarizing performance of the lens is lowered because the polarizer sheet is shrunk or thermally degraded due to the heat receiving for a long time during cast-molding.

In addition, all of the methods as described above, including a method for manufacturing an optical molded composite by an insert injection-molding method in which a polycarbonate resin layer is thermally adhered to an outermost polycarbonate sheet of a polarizing plate shown in Japanese Unexamined Patent Publication No. 245259/1999, are basically methods of hand-making lenses by one by one and, therefore, have a problem that the steps are interrupted several times between attaching, cutting and molding of the sheet during working. Such the interruption of the steps becomes a cause of forcing up the manufacturing cost due to an increase in required hands, contamination of an impurity accompanying with transfer of the sheet between the steps, lowering of a yield, and the like.

In addition, although the polarizer sheet is generally supplied in a state that a protective sheet is attached thereto, it is necessary to peel a protective sheet one by one upon covering of the polarizer sheet with a glass, or upon insert cast-molding or insert injection-molding. Since it is difficult to diselectrify static electricity during a step of separately peeling the protective sheet and a transference step thereafter, dust adsorption due to the static electricity is easily caused, and this may lead to a cause of an impurity defect of the final product.

SUMMARY OF THE INVENTION

In order to solve the technical problems as described above, the present invention provides (1) a method for continuously manufacturing an optical article which comprises a first step of thermal press-molding a sheet-like curved body and a second step of insert-molding a back resin on a concave side of the sheet-like curved body, while transferring a continuous sheet in a longitudinal direction, using an apparatus for manufacturing an optical article in which a press-molding machine which can thermal press-mold the sheet-like curved body and an insert injection-molding machine equipped with a mold having a curvature similar to that of the sheet-like curved body are serially positioned in this order, wherein a cycle of thermal press-molding and a cycle of insert injection-molding are synchronized to continuously insert injection-mold the back resin on a concave side of the sheet-like curved body while continuously thermal press-molding the sheet-like curved body.

In addition, the present invention provides (2) the method according to (1) as described above, wherein the continuous sheet is a multi-layered sheet comprising two or more layers of sheets containing one layer of a polarizer sheet.

In addition, the present invention provides (3) the method according to (2) as described above, wherein outermost attaching sheets of the continuous sheet other than the polarizer sheet are attaching sheets of acylcellulose, polycarbonate, polyamide, polyester, or a hydrocarbon-series resin having a main chain containing at least one selected from an adamantane ring residue, a norbornene ring residue and a cyclopentane ring residue.

In addition, the present invention provides (4) the method according to (2) or (3) as described above, wherein a sheet on the side of the continuous sheet on which the back resin is insert injection-molded is an attaching sheet of polycarbonate, polyamide, polyester, or a hydrocarbon-series resin having a main chain containing at least one selected from an adamantane ring residue, a norbornene ring residue and a cyclopentane ring residue.

In addition, the present invention provides (5) the method according to any one of (1)–(4) as described above, wherein the back resin is polycarbonate, polyamide, polyester, or a hydrocarbon-series resin having a main chain containing at least one selected from an adamantane ring residue, a norbornene ring residue and a cyclopentane ring residue, and is thermally adherable with the sheet-like curved body.

In addition, the present invention provides (6) the method according to any one of (1)–(5) as described above, wherein the thermal press-molding machine comprises a planar support which has a hole having a size similar to that of the sheet-like curved body, a ring clamp which concentrically secures the continuous sheet on the support around the hole, and an anvil having a size and a curvature corresponding to those of the sheet-like curved body, wherein the anvil has a structure fittable in the support, and wherein the step of thermal press-molding the continuous sheet into the sheet-like curved body comprises a cycle of stopping the feed of the continuous sheet—securing the continuous sheet on the support by the ring clamp—fitting the heated anvil in the hole of the support and thermal press-molding—returning the anvil and ring clamp to the original positions—feeding the continuous sheet as one cycle.

In addition, the present invention provides (7) the method according to any one of (1)–(6) as described above, wherein the insert injection-molding machine comprises a front mold having a curvature similar to that of the sheet-like curved body and having a suction hole for adhering thereto the sheet-like curved body by suction and a movable mold having an optional curvature, and wherein the step of insert injection-molding the optical article comprises a cycle of stopping the feed of the continuous sheet on which the sheet-like curved body is thermal press-molded-inserting the sheet-like curved body into the front mold-securing the sheet-like curved body to the front mold by suction-clamping the movable mold to the front mold-injection-molding the back resin-removing the optical article-feeding the continuous sheet as one cycle.

In addition, the present invention provides the method according to any one of (1)–(7) as described above, wherein the optical article is an optical lens.

DETAILED DESCRIPTION OF THE INVENTION

The continuous sheet to be used in the present invention will be illustrated below. The continuous sheet is usually a multi-layered sheet comprising two or more layers of sheets. It is preferable that one layer of the multi-layered sheet has the function such as the polarizing property, the photochromic property, the ultraviolet lights absorbing property, the infra-red lights absorbing property and the visible lights absorbing property, but, particularly, in the case where one layer of the multi-layered sheet is a polarizer sheet, effects of the present invention are preferably attained. Although, the present invention will be illustrated below in reference to an aspect of the polarizer sheet, for example, the polarizer sheet in the following description may be replaced with other functional sheets such as a photochromic sheet.

The polarizer sheet is a sheet having a thickness of 0.1 mm or less obtained by monoaxially stretching a resin sheet having a uniform thickness such as of poly(vinyl alcohol), poly(vinyl acetal) and poly(vinyl butyral), or treating such the stretched sheet with formal to enhance the stability thereof. Basically, the polarizer sheet is preferably wound up in a roll form.

It is preferable that the polarizer sheet has a polarization degree of 80% or greater, practically 95% or greater. In order to obtain such the high polarization degree, the monoaxially stretched sheet as described above is doped with iodine or a dichromic pigment in advance. The polarizer sheet prepared by an iodine-doping method or a pigment-doping method is applicable to the polarizer sheet of the present invention.

The iodine-doping method utilizing iodine is superior in that it scarcely imparts an inherent coloring to the polarizer sheet and that the sheet having a high polarization degree can be easily obtained, but is inferior in the heat-resistant and water-resistant properties, as compared with a pigment-doping method utilizing a dichromic pigment. The pigment-doping method imparts the higher heat-resistant and water-resistant properties, but has a problem that a hue inherent in the pigment is exhibited on the polarizer sheet.

Since the polarizer sheet is usually supplied in the state that disposable protective sheets such as of polyethylene and polypropylene are attached to both sides thereof, the protective sheets are peeled from the polarizer sheet before use.

The continuous sheet to be used in the present invention is preferably a multi-layered sheet comprising two or more layers of sheets containing one layer of a polarizer sheet. The sheets other than the polarizer sheet constitute the continuous sheet principally as an attaching sheet which attaches to the polarizer sheet.

The attaching sheet is utilized for protecting the polarizer sheet, imparting the shaping ability upon thermal press-molding of the continuous sheet into the sheet-like curved body, and thermally adhering with the back resin upon insert-molding of the back resin. One or more layers of attaching sheets are laminated onto the polarizer sheet with an adhesive or a pressure-sensitive adhesive.

The attaching sheet is generally a sheet which is molded by extrusion-molding or solvent cast-molding.

Examples of the attaching sheet which is extrusion-molded include a thermoplastic resin sheet made of polycarbonate, polyamide, polyester, polystyrene, poly(meth)acrylate, poly(vinyl chloride), poly(styrene-co-methyl methacrylate), poly(acrylonitrile-co-styrene), poly(4-methyl-1-pentene), a hydrocarbon-series resin having a main chain having an adamantane ring residue, a norbornene ring residue or a cyclopentane ring residue, polyurethane or a cellulose-series resin such as acylcellulose.

Among them, acylcellulose, polycarbonate, polyamide and polyester are preferred from a viewpoint of the toughness and the transparency.

As acylcellulose, acetylcellulose such as triacetylcellulose and diacetylcellulose, and propylcellulose such as tripropylcellulose and dipropylcellulose are preferred, and they are utilized with or without a plasticizer.

As polycarbonate, bisphenol A polycarbonate is preferable. In addition, as polycarbonate, homo polycarbonates of 1,1-bis(4-hydroxyphenyl)-1-phenylethane, bis(4-hydroxyphenyl)diphenylmethane and 2,2-bis(4-hydroxy-3-methylphenyl)propane, copolymer polycarbonates thereof, and copolymer polycarbonates with bisphenol A can be exemplified.

In general, as a demerit of polycarbonate, its greater birefringence can be exemplified. That is, polycarbonate is likely to produce the optical anisotropy due to the molding strain and local orientation in a molded article. Therefore, in the case where polycarbonate, particularly bisphenol A polycarbonate is utilized in the present invention, it is important to prevent production of the optical anisotropy as much as possible. As a strategy therefor, it is preferable to use a resin having a relatively low polymerization degree which has the high fluidity and is scarcely receiving an excessive shearing force upon molding, that is, a resin in which a residual strain and a local orientation are hardly produced. In the present invention, it is preferable that polycarbonate having a polymerization degree of 120 or less, more preferably of 100 or less is utilized.

As polyamide, polycondensates of a diamine component such as hexamethylenediamine, m-xylyleneamine, bis(4-aminocyclohexyl)methane, bis(4-amino-3-methylcyclohexyl)methane and trimethylhexamethylenediamine, and a dicarboxylic acid component such as adipic acid, dodecanedioic acid, isophthalic acid and terephthalic acid, and polycondensates of lactams such as caprolactam can be exemplified.

Particularly, polyamide called "amorphous nylon" or "transparent nylon" is preferably utilized from a viewpoint of the high transparent requirement. For example, "Grilamid TR-55" and "Grilamid TR-90" manufactured by EMS Co., Ltd., and "Trogamid CX-7323" manufactured by Huels Ltd. are suitably utilized as polyamide. The transparent nylon generally has the low optical anisotropy. In addition, there is a tendency that the transparent nylon has the higer solvent-resistant property than that of polycarbonate.

As polyester, polycondensates of dicarboxylic acids such as terephthalic acid and isophthalic acid, and diols such as ethylene glycol, butylene glycol and 1,4-cyclohexanedimethanol can be exemplified, and polyethylene terephthalate and polybutylene terephthalate and copolymer thereof are suitably utilized.

In addition, in the present invention, a resin having a photoelastic coefficient of $30 \times 10^{-13}$ cm$^2$/dyne or less, preferably $20 \times 10^{-13}$ cm$^2$/dyne or less and a glass transition temperature of 85° C. or higher, preferably 90° C. or higher is preferable for the purpose of preparing an attaching sheet having the small optical anisotropy. If the photoelastic coefficient if the resin is greater than $30 \times 10^{-13}$ cm$^2$/dyne, then the optical anisotropy of the attaching sheet due to the residual strain and the local orientation of the prepared sheet becomes remarkable. In addition, if the glass transition temperature of the resin is lower than 85° C., than there arise problems that a practicability as transparent optical articles such as sunglasses, goggles and correcting lens is deteriorated, and the articles is likely to deform in higher order processing which requires heating such as hard-coating and reflection preventing processing.

As thermoplastic resins which satisfy the photoelastic coefficient and glass transition temperature requirements as described above, there are hydrocarbon-series resins having an adamantane ring residue, a norbornene ring residue or a cyclopentane ring residue as a main chain such as "ARTON" manufactured by JSR Corporation, "ZEONEX" manufactured by Nihon-Zeon Corporation and "APEL" manufactured by Mitsui Chemicals Co., Ltd., polyester-series resins having a fluorene group as a side chain such as "OPTOREZ" manufactured by Hitachi Chemical Co., Ltd., and poly(meth)acrylates including homopolymers and copolymers of methyl methacrylate or cyclohexyl methacrylate, and hydrocarbon-series resins having an adamantane ring residue, a norbornene ring residue or a cyclopentane ring residue as a main chain are particularly preferable.

Preferably, the attaching sheet is substantially free of or abolished of molecular orientation. As one example of the extrusion-molding method for preparing such the attaching sheet, there are a T-die method in which a resin extruded from a transversely elongated die in the melt or softened state is received on a holding apparatus or a running belt, which is not stretched in a longitudinal or transverse direction accompanying with the molecular orientation, or stretched, then which is cooled or desolvated to cure into a sheet shape, and a tubular method in which a resin is extruded into a balloon shape, followed by curing.

In addition, when the resin has the inferior extrusion-molding property, there is a solvent cast-molding method in which a resin solution prepared by dissolving the resin in a solvent is casted on a running belt or a plate, which is desolvated by pressure reduction or heating to prepare a sheet. As the particularly preferable resin to which the solvent cast-molding method is applicable, there are acylcellulose-series resins such as triacetylcellulose, diacetylcellulose, tripropylcellulose and dipropylcellulose. In addition, even the resins which can be extrusion-molded can be molded by the solvent cast-molding method for the purpose of substantially abolishing the molecular orientation.

It is basically preferable that the attaching sheet is wound up in a roll form whether the manufacturing method of the sheet is a T-die method, a tubular method, a solvent cast-molding method, or the like.

As the attaching sheet, sheets having a thickness of approximately 0.01–1.0 mm, preferably approximately 0.03–0.8 mm are generally utilized. When a thickness of the attaching sheet is less than 0.01 mm, there is a tendency that the protective action of the polarizer sheet is lowered and that the shaping ability upon thermal press-molding of the continuous sheet into the sheet-like curved body is deteriorated. In addition, when a thickness of the attaching sheet is less than 0.01 mm, the thermal adhesion property of the attaching sheet with the back resin upon insert-molding of the back resin may be deteriorated in some cases. On the other hand, a thickness of the attaching sheet is greater than 1.0 mm, there is a possibility that a bending rigidity of the attaching sheet becomes great and, thereby, the workability and the processability such as the windability and the attachability are deteriorated.

The continuous sheet to be used in the present invention preferably has a simple structure such that a thickness thereof becomes as thin as possible, from a viewpoint of the windability of the continuous sheet in the roll form and the cost, although it is preferably a multi-layered sheet in which at least both sides of the polarizer sheet are held by two or more of attaching sheets.

The simplest structure of the continuous sheet is the case of a three-layered structure of an attaching sheet A/polarizer sheet/attaching sheet B. In this case, at least one of the attaching sheets A and B is thermally adherable with the back resin, and the back sheet is insert injection-molded on the side of the thermally adherable attaching sheet (attaching sheets A and B may be the same or different).

In addition, in the case where both of the attaching sheets A and B in the structure as described above are difficult to thermally adhere with the back resin, and in the case where a thickness is insufficient for the shaping ability upon thermal press, then the continuous sheet preferably has a four-layered structure of an attaching sheet A/polarizer sheet/attaching sheet B/attaching sheet C. In this case, it is preferable that the resin is selected such that the attaching sheet C can be thermally adhered with the back resin (A, B and C may be the same or different from each other).

Accordingly, the resin for the attaching sheet to be thermally adhered with the back resin and the back resin are preferably a resin which can be molded into a sheet by an extrusion-molding method, particularly, are preferably polycarbonate, polyamide or polyester resin from a viewpoint of the toughness and the transparency. In addition, the hydrocarbon-series resin having an adamantane ring residue, a norbornene ring residue or a cyclopentane ring residue as a main chain which has the small optical anisotropy is preferable. As the resin of the attaching sheet which is not necessary to be thermally adhered with the back resin, acylcellulose, polycarbonate, polyamide and polyester resins are preferred. In addition, the hydrocarbon-series resin having an adamantane ring residue, a norbornene ring residue or a cyclopentane ring residue as a main chain which has the small optical anisotropy is preferable.

As a method for laminating the polarizer sheet and the attaching sheet to prepare the continuous sheet as described above, a method is preferable in which both of the sheets are attached with an adhesive or a pressure-sensitive adhesive. Both of the adhesive and the pressure-sensitive adhesive require the long term durability against water, heat, light and the like and, basically, they are not particularly limited so long as they satisfy such the requirements.

Examples of the adhesive include isocyanate, polyurethane, polythiourethane, epoxy, vinyl acetate, acrylic and wax-series adhesives. Examples of the pressure-sensitive adhesive include vinyl acetate and acrylic-series pressure-sensitive adhesives.

Furthermore, various functions can be imparted to the optical article of the present invention by dissolving or mixing functional compounds having the photochromic property, the ultraviolet lights absorbing property, the infrared lights absorbing property, or the visible lights absorbing property in the adhesive or the pressure-sensitive adhesive.

Such the adhesive or pressure-sensitive adhesive can be uniformly coated on the attaching sheet or the polarizer sheet according to the coating methods usually utilized such as a gravure coating method and an offset coating method. A thickness of an adhesive layer or a pressure-sensitive adhesive layer is usually 0.1–100 $\mu$m, preferably 0.5–80 $\mu$m. When a thickness of the adhesive layer or the pressure-sensitive adhesive layer is less than 0.1 $\mu$m, then the adhering force is weaken and, on the other hand, when a thickness of the adhesive layer or the pressure-sensitive adhesive layer is greater than 100 $\mu$m, then the adhesive or the pressure-sensitive adhesive may be bleeded from an edge face of the optical composite.

In order to enhance the adhering force between the sheets by the adhesive or the pressure-sensitive adhesive, the surface of the attaching sheet or the polarizer sheet may be treated with a solution of a chemical agent such as acids and alkalis, the ultraviolet lights, the plasma or the corona discharge in advance.

The continuous sheet of the present invention can be prepared according to a method in which the adhesive or the pressure-sensitive adhesive is coated on the attaching sheet or the polarizer sheet in advance or immediately before attaching, then the sheets are attached to laminate directly from a roll or in the cut state, and then, if needed, the curing treatment is conducted. Basically, the continuous sheet is preferably wound up in a roll form.

Although the continuous sheet may take various forms, the case where the polarizer sheet in a roll form and the attaching sheet in a roll form are attached to laminate to prepare the continuous sheet is preferable in the present invention. Alternatively, the case where the polarizer sheet in the cut state or others having the same function are attached at defined intervals in the course of spreading the attaching sheet in a roll form to prepare the continuous sheet as a whole is also preferable. In this case, although the sheet has a continuous-sheet form as a whole, it is arranged so that a portion having a polarizing function is localized only on a portion to be thermal press-molded into the sheet-like curved body. This is a preferable method from a viewpoint of diminishing a loss of the functional portion.

It is preferable that the step of preparing a continuous sheet is synchronized with a step of thermally pressing into a sheet-like curved body and a step of insert injection-molding a back resin, which are conducted in the present invention, to continuously conduct with adjusting to a speed of manufacturing the optical article of the present invention from a viewpoint of laborsaving or prevention of contamination of an impurity.

Next, a method for continuously manufacturing an optical article by utilizing such the continuous sheet will be illustrated. The present invention is a method for continuously manufacturing an optical article by which comprises a first step of thermal press-molding a sheet-like curved body and a second step of insert-molding a back resin on a concave side of the sheet-like curved body, while transferring a continuous sheet in a longitudinal direction, using an apparatus for manufacturing an optical article in which a press-molding machine which can thermal press-mold the sheet-like curved body and an insert injection-molding machine equipped with a mold having a curvature similar to that of the sheet-like curved body are serially positioned in this order, wherein a cycle of thermal press-molding and a cycle of insert injection-molding are synchronized to continuously insert injection-mold the back resin on a concave side of the sheet-like curved body while continuously thermal press-molding the sheet-like curved body.

The present invention is a method for continuously manufacturing an optical lens which further comprises continuously conducting the surface treatment such as hard-coating, fog-resistant processing and dying, inspection and storage of the resulting optical lens, as necessary, by serially arranging an apparatus for conducting said surface treatment, an automated inspection apparatus, and an apparatus for storing the product.

The thermal press-molding machine to be used in the present invention is generally composed of a movable mold and a front mold. One of the movable mold and the front mold has a male type shape and another has a female type shape. The continuous sheet is put between them, and thermal press-molding and shaping are conducted by combining them.

Regarding the method of thermal press-molding into a sheet-like curved body, there are following combinations depending upon a mold shape and heating or not.

(Case 1) The case where the sheet-like curved body is formed with a male type mold. A head of the male type mold has a shape of a desired curved body to be shaped, and this portion is heated. As the front mold, the male type mold having a shape of a curved body is not necessarily required.

(Case 2) The case where the sheet-like curved body is formed with a female type mold. A concave surface of the female type mold has a shape of a desired curved body, and this portion is heated. Although the male type mold is required, a head having a shape of a curved body may be made of a deformable rubber. The male type mold is not necessarily required to be heated.

(Case 3) The case where the sheet-like curved body is formed with both of the male type mold and the female type mold. A head of the male type mold and a concave surface of the female type mold have a shape of a desired curved body, and at least one of them is heated.

Any of the aforementioned methods is applicable in the present invention, but most suitably applied is Case 1. Inter alia, the thermal press-molding machine comprises a planar support having a hole of a size similar to that of the sheet-like curved body, a ring clamp securing concentrically the continuous sheet on the support around the hole, and an anvil having a size and a curvature corresponding to those of the sheet-like curved body, wherein the anvil has a structure fittable in the support.

In this case, although the support and the anvil correspond to a mold, and one of them corresponds to a movable mold and another corresponds to a front mold, in the present invention, preferably the anvil corresponds to the movable mold, because a mechanical structure can be more simplified.

In addition, the anvil corresponds to a male type mold, and it is manufactured so that a head thereof has a curvature corresponding to a shape of a desired body to be shaped. In addition, a mechanism which can heat at a particular degree by a heater or a heating medium is build in the anvil.

In this case, although the member corresponding to the female type mold is not present, the curved body is shaped by a method of securing the continuous sheet by the planar support having a hole of a size similar to that of the sheet-like curved body and the ring clamp concentrically securing the continuous sheet around the hole, pushing the anvil against the continuous sheet, and fitting the anvil in the hole of the support.

A temperature of the anvil is preferably higher than a glass transition temperature of a sheet which contributes to the shaping ability among sheets constituting the continuous sheet.

Upon thermal press-molding, a direction of the continuous sheet is adjusted so that the attaching sheet which thermally adheres with the back resin is positioned on the concave surface. That is, in the case where the constitution of the continuous sheet is an attaching sheet A/polarizer sheet/attaching sheet B, when the attaching sheet B is positioned on a side to which the back resin is thermally adhered, then the continuous sheet is positioned so that the attaching sheet B is positioned on the concave surface to thermal press-mold into the sheet-like curved body. In addition, in the case where the continuous sheet has a four-layered constitution of an attaching sheet A/polarizer sheet/attaching sheet B/attaching sheet C, when the attaching sheet C is thermally adhered with the back resin, then the continuous sheet is positioned so that the attaching sheet C is positioned on the concave surface.

One cycle of thermal press-molding comprises the following procedures, and it is conducted so as to synchronize with one cycle of the next step, insert injection-molding. That is, one cycle of thermal press-molding for attaining the present invention comprises stopping the feed of the continuous sheet—securing the continuous sheet on the support by a ring clamp—fitting the heated anvil in the hole of the support and thermal press-molding—returning the anvil and the ring clamp to the original positions—feeding the continuous sheet.

Each unit operation involved in the procedures as above described may be independently conducted, or two or more of unit operations may be proceeded in parallel. In addition, if needed, cooling after thermal press-molding, for example, air-blowing to the sheet-like curved body, and the like may be conducted in one cycle. It is important that the cycle of thermal press-molding is synchronized with the cycle of insert injection-molding.

Although there are a compression-molding method, a transfer-molding method, an injection-molding method, and the like as a molding method of the back resin, basically, an insert injection-molding method as described in Japanese Unexamined Patent Publication No. 245259/1999 is preferable from a viewpoint of the productivity and the precision. The insert injection-molding machine preferably utilized in the present invention is an apparatus which can insert injection-mold the back resin on the concave side of the sheet-like curved body as described above.

More specifically, the present invention takes a method in which the sheet-like curved body is mounted on a front mold so that the side thereof to which the back resin is thermally adhered is directed to the cavity, the movable mold is clamped to the front mold, and then the back resin is injection-molded using an insert injection-molding machine comprising the front mold having a suction hole for adhering thereto the sheet-like curved body by suction, which has a curvature similar to that of the sheet-like curved body, and a movable mold having an optional curvature.

Inter alia, for use which requires precision such as for an optical lens, an injection compression-molding machine of an insert type is preferable. The injection compression-molding method hardly produces the optical anisotropy of the molded article due to the molding strain and the local orientation upon molding, because it takes a method in which a resin is injected in a mold at a low pressure, followed by application of the compressive force to the resin by closing the molds at a high pressure. In addition, particularly, this method is preferably applied to the polycarbonate-series resin having a high birefringence and can prepare the molded article with high dimensional accuracy, because the resin can be cooled with a constant specific volume by controlling a compressive force of the mold which is uniformly applied to the resin.

It is preferable that the resin for the attaching sheet and the resin for the back resin are the same series resins, because the attaching sheet of the outermost layer of the concave surface and the back resin are required to thermally adhere at a practical level of a bonding strength. Particularly, the object of the present invention is preferably attained when both of the resins are the same.

In manufacturing an optical lens in the present invention, when a thickness of a portion of the sheet-like curved body of the optical lens is X and a thickness of the back resin is Y, then X is usually a uniform thickness of approximately 0.1–2 mm over the all region of the optical lens. On the other hand, Y may be a uniform thickness, or may be a thickness sequentially changing from a central portion to a peripheral portion of the lens, as a lens with degree such as a lens with minus or plus degree. With respect to the region inside of a radius of 35 mm from a center of the optical lens, it is practically preferable that Y is usually within a range of approximately 0.5–20 mm in all of the region.

In a cycle of insert injection-molding in the present invention, one cycle is composed of stopping the feed of the continuous sheet in which the sheet-like curved body has been formed by thermal press-molding—inserting the sheet-like curved body in the front mold—securing the sheet-like curved body to the front mold by suction—clamping the movable mold—injection-molding the back resin—removing of an optical article—feeding the continuous sheet.

Each unit operation involved in the procedures as described above may be independently conducted, or two or more of unit operations may be proceeded in parallel. In addition, the cycle as described above involves an operation of cooling after injection-molding, and an operation of cutting out the sheet-like curved body from the continuous sheet for inserting the body into the front mold. In the present invention, it is important upon insert injection-molding that the cycle of thermal press-molding of the sheet-like curved body is synchronized with the cycle of insert injection-molding.

The already used continuous sheet which has passed an insert injection-molding step is usually wound up on a roll.

It is preferable that at least either side of the surface of the optical article of the present invention is treated with hard-coat processing. The hard coat may be any type of hard coat generally utilized, for example, thermally curing type-hard coats such as of silane- and epoxy-series, and active ray curing type-hard coats such as of (meth)acryl- and epoxy-series. The hard coat is usually provided thereon at a thickness of approximately 0.5–15 μm by a wet method or, in some cases, the hard coat may be provided over a coated primer coating layer such as of (meth)acrylate for enhancement of the adherability, or the like.

In addition, it is preferable that at least either side of the surface of the optical article of the present invention is treated with anti-reflective processing. Anti-reflective processing is usually conducted by laminating approximately 2–8 of inorganic layers, adjacent layers of which have a different refractive index from each other, on the hard coat at an optical thickness by a dry process such as vacuum deposition, or conducted by laminating approximately 1–3 of organic layers at an optical thickness by a wet process.

In addition, it is preferable that at least either side of the surface of the optical article of the present invention is treated with fog-resistant processing. Fog-resistant processing is conducted by providing thereon a hydrophilic resin such as of poly(vinyl alcohol)- and poly(vinylpyrrolidone)-series at a thickness of approximately 1–50 μm by a wet process. In addition, when the outermost attaching sheet is an acylcellulose-series resin, the fog-resistant property can be imparted by the saponification treatment of the surface.

In addition, it is preferable that at least either side of the surface of the optical article of the present invention is treated with anti-staining processing. Anti-staining processing is conducted by providing thereon a fluorinated organic compound at a thickness of an order of several tens nanometer to a micrometer by a dry process such as a vacuum deposition method or a wet process, for the purpose of prevention of the anti-refractive layer from staining with organic materials such as a finger print and easy removement of such materials.

In addition, it is preferable that at least either side of the surface of the optical article of the present invention is treated with mirror processing. Mirror processing is conducted by providing thereon a metal layer such as of aluminum, silver, gold and platinum by a dry process such as a vacuum deposition method.

In addition, it is preferable that the optical article of the present invention is treated with a pigment by a wet process for the purpose of controlling the transmittance of the visible light.

In the present invention, it is preferable that the article or intermediate article is continuously, particularly automatically, received in a receiving container, after insert injection-molding, or after finishing all steps or each step of hard coat processing, anti-reflective processing, fog-resistant processing, anti-staining processing, mirror processing, and the treatment with a pigment.

In addition, in the present invention, it is preferable that the article or intermediate article is inspected continuously, particularly automatically, by optical techniques such as an impurity inspection, a transmittance of the visible light inspection, a reflectance inspection and a hue inspection, after insert injection-molding, or after finishing all steps or each step of hard coat processing, anti-reflective processing, fog-resistant processing, anti-staining processing, mirror processing, and the treatment with a pigment.

EXAMPLE

The following Examples specifically illustrate the present invent, but the present invention is not limited thereto.

Example 1

A polarizing plate was prepared in which a polarizer sheet having a thickness of approximately 40 μm is held between two triacetylcellulose (TAC) sheets each having a thickness of approximately 80 μm as a protective attaching sheet.

A transparent nylon, "Grilamid TR-90" (manufactured by EMS Co., Ltd.) sheet having a thickness of approximately 200 μm was prepared as an attaching sheet for thermally adhering with a back resin, and one side thereof was coated with an acrylic-series pressure-sensitive adhesive, "Saibinol AT-250" (manufactured by Saiden Chemical Industry Co., Ltd.) at a thickness of approximately 30 μm. The attaching sheet for thermally adhering was attached to one side of the polarizing plate as described above to prepare a continuous sheet having a width of 11 cm.

A thermal press-molding machine was prepared which comprises a planar support having a hole of 80 mm diameter corresponding to a size of a sheet-like curved body, a ring clamp which concentrically secures the continuous sheet on the support around the hole, and a heatable anvil having a diameter of 80 mm and a curvature of 6C (curve), wherein the anvil has a structure fittable in the support.

Subsequently, the thermal press-molding was continuously constructed at one cycle of stopping the feed of the continuous sheet—securing the continuous sheet on the support by the ring clamp—fitting the anvil heated at 140° C. in the hole of the support and thermal press-molding—returning the anvil and the ring clamp to the original positions—feeding the continuous sheet for one minute. Once cycle involved cooling of the continuous sheet with an air stream after thermal press-molding.

Subsequently, the thermal press-molding was continuously consucted at one cycle of [stopping the feed of the continuous sheet—securing the continuous sheet on the support by the ring clamp—fitting the anvil heated at 140□ in the hole of the support and thermal press-molding—returning the anvil and the ring clamp to the original positions—feeding the continuous sheet] for one minute. One cycle involved cooling of the continuous sheet with an air stream after thermal press-molding.

The sheet-like curved body having a diameter of 80 mm and a curvature of 6C was continuously formed on the continuous sheet at 3 cm intervals.

An insert injection-molding machine was prepared which comprises a front mold having a diameter of 80 mm and a curvature of 6C, which are the same as those of the sheet-like curved body, and having a suction hole for adhering thereto the sheet-like curved body by suction, and a movable mold having the same curvature as that of the front mold.

Subsequently, the aforementioned continuous sheet on which the sheet-like curved body had been molded was inserted into the insert injection compression-molding machine without cutting, and "Grilamid TR-90" as a back resin-was insert injection compression-molded on the concave side of the sheet-like curved body. The insert injection compression-molding was conducted at one cycle of stopping the feed of the continuous sheet on which the sheet-like curved body had been formed by thermal press-molding—inserting the sheet-like curved body into the front mold—securing the sheet-like curved body to the front mold by suction—clamping the movable mold—injection compressing-molding the back resin—removing the optical article—feeding the continuous sheet for one minute, while the cycle of insert injection compression-molding was synchronized with the cycle of thermal press-molding. Moreover, one cycle involved a cutting step upon inserting the sheet-like curved body into the front mold.

The resulting optical article was a semi-finished lens having a diameter of 80 mm and a curvature of 6C (curve), in which the polarizing plate was positioned on the convex side and the "Grilamid TR-90" layer having a thickness of approximately 13 mm was incorporated on the back (concave) side.

Example 2

The pressure-sensitive adhesive used in Example 1 was coated, at a thickness of approximately 30 μm, on a sheet having a thickness of approximately 170 μm as an attaching sheet, which had been prepared by using polycarbonate having an average degree of polymerization of approximately 80 (Idemitsu Petrochemical Co., Ltd.).

A continuous sheet having a width of 11 cm was prepared by attaching the polycarbonate sheet as described above to both sides of the polarizer sheet used in Example 1.

According to the same manner as that of Example 1 except that the anvil was heated at 153° C., the continuous sheet was subjected to the thermal press-molding machine to mold a sheet-like curved body having a diameter of 80 mm and a curvature of 6C on the continuous sheet at 3 cm intervals.

According to the same manner as that of Example 1 except that a curvature of the movable mold of the insert injection compression-molding machine was changed to that for −4.00 D (diopter), polycarbonate having an average degree of polymerization of 80 as a back resin was used to insert injection compression-mold on the continuous sheet which had been thermal press-molded. The resulting optical article was a lens having a curvature of −4.00 D.

Such the lens was automatically removed, and was continuously stocked in a receiving container. Subsequently, the lens was automatically transferred to an apparatus for examining degree of a lens, an examination of degree of a lens was conducted, and the lens which had passed the examination was automatically stocked in a receiving container.

Subsequently, the lens was automatically taken out from the receiving container, immersed in a coating tank filled with a silane-series hard coat liquid, and uniformly coated with the hard coat liquid. Thereafter, the lens was automatically transferred to a thermal curing oven, and cured at 110° C. for 2 hours. The lens which had been thermally cured was automatically stocked in a receiving container.

Thereafter, the lens was automatically supplied to an apparatus for optically detecting an impurity, and the lens which had passed was automatically stocked in a receiving container.

According to the method for manufacturing of the present invention, optical articles, particularly, goggles, sunglasses and eye glasses having the large impact strength and the high polarization degree can be effectively provided at the low cost.

What is claimed is:

1. A method for continuously manufacturing an optical article which comprises a first step of thermal press-molding a sheet-like curved body and a second step of insert-molding a back resin on a concave side of the sheet-like curved body, while transferring a continuous sheet in a longitudinal direction, using an apparatus for manufacturing an optical article in which a press-molding machine which can thermal press-mold the sheet-like curved body and an insert injection-molding machine equipped with a mold having a curvature similar to that of the sheet-like curved body are serially positioned in this order, wherein a cycle of thermal press-molding and a cycle of insert injection-molding are synchronized to continuously insert injection-mold the back resin on a concave side of the sheet-like curved body while continuously thermal press-molding the sheet-like curved body.

2. The method according to claim 1, wherein the continuous sheet is a multi-layered sheet comprising two or more layers of sheets containing one layer of a polarizer sheet.

3. The method according to claim 2, wherein sheets of the continuous sheet other than the polarizer sheet include an attaching sheet of acylcellulose, polycarbonate, polyamide, polyester, and a hydrocarbon-series resin having a main chain containing at least one residue selected from the group consisting of an adamantane ring residue, a norbornene ring residue and a cyclopentane ring residue.

4. The method according to claim 2, wherein one of outermost attaching sheets of the continuous sheet, on which the back resin is insert injection-molded, is an attaching sheet of polycarbonate, polyamide, polyester, and a hydrocarbon-series resin having a main chain containing at least one residue selected from the group consisting of an adamantane ring residue, a norbornene ring residue and a cyclopentane ring residue.

5. The method according to claim 1, wherein the back resin is polycarbonate, polyamide, polyester, and a hydrocarbon-series resin having a main chain containing at least one residue selected from the group consisting of an adamantane ring residue, a norbornene ring residue and a cyclopentane ring residue, and is thermally adherable with the sheet-like curved body.

6. The method according to claim 1, wherein the thermal press-molding machine comprises a planar support which has a hole having a size similar to that of the sheet-like curved body, a ring clamp which concentrically secures the continuous sheet on the support around the hole, and an anvil having a size and a curvature corresponding to those of the sheet-like curved body, wherein the anvil has a structure fittable in the support, and wherein the step of thermal press-molding the continuous sheet into the sheet-like curved body comprises a cycle of: stopping the feed of the continuous sheet; securing the continuous sheet on the support by the ring clamp; fitting the heated anvil in the hole of the support and thermal press-molding; returning the anvil and the ring clamp to the original positions; and feeding the continuous sheet.

7. The method according to claim 1, wherein the insert injection-molding machine comprises a front mold having a curvature similar to that of the sheet-like curved body and having a suction hole for adhering thereto the sheet-like curved body by suction and a movable mold having an optional curvature, and wherein the step of insert injection-molding the optical article comprises a cycle of: stopping the feed of the continuous sheet on which the sheet-like curved body is thermal press-molded; inserting the sheet-like curved body into the front mold; securing the sheet-like curved body to the front mold by suction; clamping the movable mold; injection-molding the back resin; removing the optical article; and feeding the continuous sheet.

8. The method according to claim 1, wherein the optical article is an optical lens.

9. The method according to claim 3, one of outermost attaching sheets of the continuous sheet, on which the back resin is insert injection-molded, is an attaching sheet of polycarbonate, polyamide, polyester, and a hydrocarbon-series resin having a main chain containing at least one residue selected from the group consisting of an adamantane ring residue, a norbornene ring residue and a cyclopentane ring residue.

10. The method according to claim 2, wherein the back resin is polycarbonate, polyamide, polyester, and a hydrocarbon-series resin having a main chain containing at least one residue selected from the group consisting of an adamantane ring residue, a norbornene ring residue and a cyclopentane ring residue, and is thermally adherable with the sheet-like curved body.

11. The method according to claim 3, wherein the back resin is polycarbonate, polyamide, polyester, and a hydrocarbon-series resin having a main chain containing at least one residue selected from the group consisting of an adamantane ring residue, a norbornene ring residue and a cyclopentane ring residue, and is thermally adherable with the sheet-like curved body.

12. The method according to claim 4, wherein the back resin is polycarbonate, polyamide, polyester, and a hydrocarbon-series resin having a main chain containing at least one residue selected from the group consisting of an adamantane ring residue, a norbornene ring residue and a cyclopentane ring residue, and is thermally adherable with the sheet-like curved body.

13. The method according to claim 2, wherein the thermal press-molding machine comprises a planar support which has a hole having a size similar to that of the sheet-like curved body, a ring clamp which concentrically secures the continuous sheet on the support around the hole, and an anvil having a size and a curvature corresponding to those of the sheet-like curved body, wherein the anvil has a structure fittable in the support, and wherein the step of thermal press-molding the continuous sheet into the sheet-like curved body comprises a cycle of: stopping the feed of the continuous sheet; securing the continuous sheet on the support by the ring clamp; fitting the heated anvil in the hole of the support and thermal press-molding; returning the anvil and the ring clamp to the original positions; feeding the continuous sheet.

14. The method according to claim 3, wherein the thermal press-molding machine comprises a planar support which has a hole having a size similar to that of the sheet-like curved body, a ring clamp which concentrically secures the continuous sheet on the support around the hole, and an anvil having a size and a curvature corresponding to those of the sheet-like curved body, wherein the anvil has a structure fittable in the support, and wherein the step of thermal press-molding the continuous sheet into the sheet-like curved body comprises a cycle of: stopping the feed of the continuous sheet; securing the continuous sheet on the support by the ring clamp; fitting the heated anvil in the hole of the support and thermal press-molding; returning the anvil and the ring clamp to the original positions; feeding the continuous sheet.

15. The method according to claim 4, wherein the thermal press-molding machine comprises a planar support which has a hole having a size similar to that of the sheet-like curved body, a ring clamp which concentrically secures the continuous sheet on the support around the hole, and an anvil having a size and a curvature corresponding to those of the sheet-like curved body, wherein the anvil has a structure fittable in the support, and wherein the step of thermal press-molding the continuous sheet into the sheet-like curved body comprises a cycle of: stopping the feed of the continuous sheet; securing the continuous sheet on the support by the ring clamp; fitting the heated anvil in the hole of the support and thermal press-molding; returning the anvil and the ring clamp to the original positions; and feeding the continuous sheet.

16. The method according to claim 5, wherein the thermal press-molding machine comprises a planar support which has a hole having a size similar to that of the sheet-like curved body, a ring clamp which concentrically secures the continuous sheet on the support around the hole, and an anvil having a size and a curvature corresponding to those of the sheet-like curved body, wherein the anvil has a structure fittable in the support, and wherein the step of thermal press-molding the continuous sheet into the sheet-like curved body comprises a cycle of: stopping the feed of the continuous sheet; securing the continuous sheet on the support by the ring clamp; fitting the heated anvil in the hole of the support and thermal press-molding; returning the anvil and the ring clamp to the original positions; and feeding the continuous sheet.

17. The method according to claim 2, wherein the insert injection-molding machine comprises a front mold having a curvature similar to that of the sheet-like curved body and having a suction hole for adhering thereto the sheet-like curved body by suction and a movable mold having an optional curvature, and wherein the step of insert injection-molding the optical article comprises a cycle of: stopping the feed of the continuous sheet on which the sheet-like curved body is thermal press-molded; inserting the sheet-like curved body into the front mold; securing the sheet-like curved body to the front mold by suction; clamping the movable mold; injection-molding the back resin; removing the optical article; and feeding the continuous sheet.

18. The method according to claim 3, wherein the insert injection-molding machine comprises a front mold having a curvature similar to that of the sheet-like curved body and having a suction hole for adhering thereto the sheet-like curved body by suction and a movable mold having an optional curvature, and wherein the step of insert injection-molding the optical article comprises a cycle of: stopping the feed of the continuous sheet on which the sheet-like curved body is thermal press-molded; inserting the sheet-like curved body into the front mold; securing the sheet-like curved body to the front mold by suction; clamping the movable mold; injection-molding the back resin; removing the optical article; feeding the continuous sheet.

19. The method according to claim 4, wherein the insert injection-molding machine comprises a front mold having a curvature similar to that of the sheet-like curved body and having a suction hole for adhering thereto the sheet-like curved body by suction and a movable mold having an optional curvature, and wherein the step of insert injection-molding the optical article comprises a cycle of: stopping the feed of the continuous sheet on which the sheet-like curved body is thermal press-molded; inserting the sheet-like curved body into the front mold; securing the sheet-like curved body to the front mold by suction; clamping the movable mold; injection-molding the back resin; removing the optical article; and feeding the continuous sheet.

20. The method according to claim 5, wherein the insert injection-molding machine comprises a front mold having a curvature similar to that of the sheet-like curved body and having a suction hole for adhering thereto the sheet-like curved body by suction and a movable mold having an optional curvature, and wherein the step of insert injection-molding the optical article comprises a cycle of: stopping the feed of the continuous sheet on which the sheet-like curved body is thermal press-molded; inserting the sheet-like curved body into the front mold; securing the sheet-like curved body to the front mold by suction; clamping the movable mold; injection-molding the back resin; removing the optical article; feeding the continuous sheet.

* * * * *

UNITED STATES PATENT AND TRADEMARK OFFICE
CERTIFICATE OF CORRECTION

PATENT NO. : 6,814,902 B2
DATED : November 9, 2004
INVENTOR(S) : Ishibashi et al.

It is certified that error appears in the above-identified patent and that said Letters Patent is hereby corrected as shown below:

Column 5,
Line 6, change "higer" to -- higher --.
Line 58, change "casted" to -- cast --.

Column 11,
Line 31, change "removement" to -- removal --.

Column 12,
Line 31, change "consucted" to -- constructed --.
Line 31, delete bracket "[" before "stopping".
Line 33, change "140□" to -- 140° --.
Line 36, delete bracket "]" after "sheet".

Signed and Sealed this

Twenty-third Day of August, 2005

JON W. DUDAS
*Director of the United States Patent and Trademark Office*